Aug. 19, 1930.   B. B. DOLLY   1,773,423
AIR OPERATED GREASE PUMP
Filed June 11, 1929
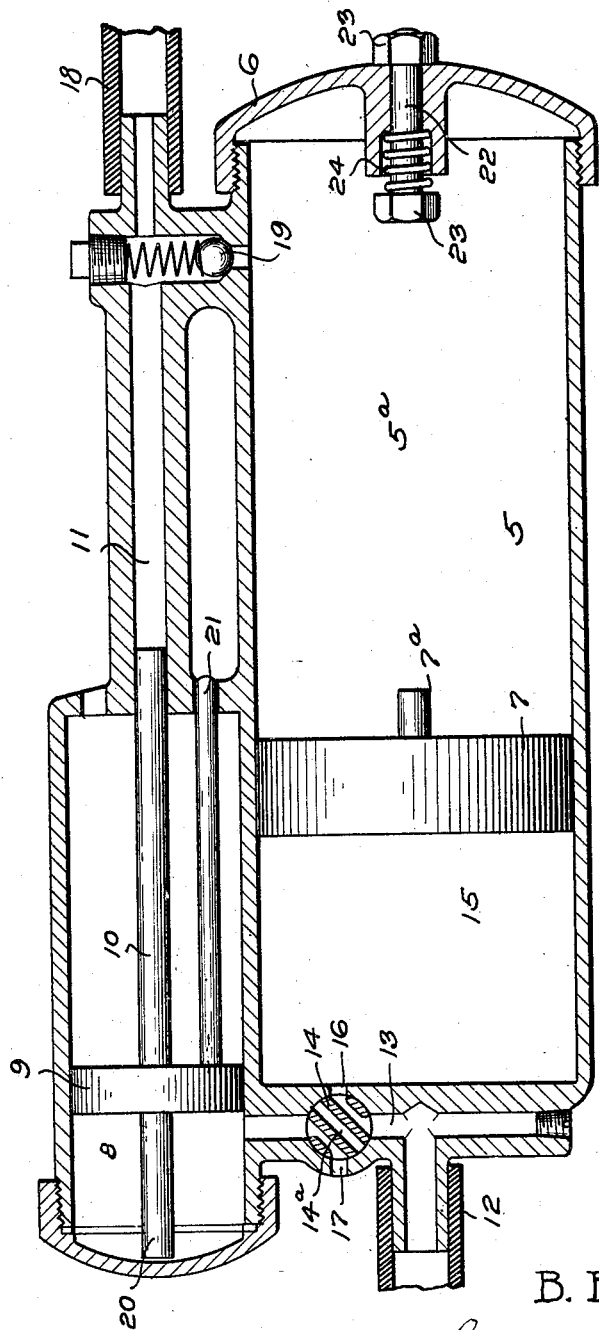
Inventor
B. B. DOLLY,
By Samuel Herrick,
Attorney Patented Aug. 19, 1930

1,773,423

UNITED STATES PATENT OFFICE

BERNARD B. DOLLY, OF COTTONWOOD, ARIZONA

AIR-OPERATED GREASE PUMP

Application filed June 11, 1929. Serial No. 370,030.

This invention relates to an air operated grease pump, and it has for its object to provide a structure adapted to be operated by the sources of compressed air such as are commonly found in garages, service stations, and the like, and which will function to discharge grease, at very high pressure, into the bearings of mechanisms that are to be lubricated, such as automobiles, for example.

It is well known that most bearings can be lubricated with grease under a relatively low pressure, but occasionally a bearing is encountered in which grease and dirt has caked and hadened in such manner that only very high pressure will drive the fresh grease thereinto.

The device of the present invention is particularly designed to take care of this situation.

The figure shown in the accompanying drawing is a sectional view of a grease pump constructed in accordance with the invention.

In the drawing, 5 designates a relatively large grease cylinder provided, at its forward end, with a removable cap 6, through which the chamber may be filled with grease. A plunger 7 is mounted to travel in the cylinder. A second cylinder 8 has a piston 9 disposed therein, which operates the high pressure plunger 10, the latter being disposed to travel in the high pressure grease chamber 11. Compressed air, say at eighty pounds pressure, is delivered from the supply hose 12 to air conduit 13. If the triple port valve or cock 14 be momentarily turned so that its central port 14ª lies vertically, air will pass into the cylinder 8, at the left hand side of the piston 9, and force the high pressure plunger toward the right, ejecting air from the high pressure grease chamber 11.

The valve or cock 14 is then turned so that its central port lies horizontal. This permits the air in chamber 15, of cylinder 5, to waste through ports 16, 14ª and 17, while checking the entry of more air to conduit 13. This will permit the operator to unscrew the cap 6, and fill the grease chamber 5ª with grease, the plunger 7 being forced back to the left hand end of the cylinder by the packing of the grease into grease chamber 5ª.

After the cap has been restored to its former position, the pump is ready to have its discharge hose 18 coupled to the bearing to be lubricated. The cock 14 is then turned to the position illustrated in the drawing, which permits air to enter air chamber 15 and force the plunger 7 toward the right. This forces the grease out of the grease chamber 5ª past a ball check valve 19, and into the hose 18. Some of the grease will also enter the high pressure grease chamber 11 and force the plunger 9 toward the left, until it is stopped by a stop rod 20. If the entry of the grease to the bearing to be lubricated offers less resistance than can be overcome by the eighty pounds pressure imposed upon plunger 7, grease will be delivered directly to said bearing, but if the bearing is caked so that the eighty pounds pressure will not force the grease thereinto, a much higher pressure may be imposed upon the grease in the discharge hose, by turning the cock 14 to a position where its central port 14ª lies vertical. The air pressure will then pass through conduit 13 to the left hand side of the piston 9, and will force grease from the high pressure grease chamber into the discharge hose at a pressure up to twenty-five hundred pounds, if need be, because eighty pounds pressure against piston 9 will create pressure in the chamber 11, in the relation that the square of the diameter of the piston 9 bears to the square of the diameter of the plunger or piston 10. This operation may be repeated as often as desired by simply turning cock 14 back to the position shown in the drawing, and then to upright position again.

An indicator rod 21 travels out with the piston 9 to indicate the amount of grease that the booster or high pressure plunger is delivering. The cap 6 carries an indicator consisting of a rod 22, having nuts or other heading elements 23 upon its opposite ends. A spring 24 normally holds this rod in retracted position, but when the grease chamber 5ª becomes so nearly exhausted of grease that the projection 7ª on the piston 9, strikes the head or nut 23 of rod 22, the latter will be forced to the right against the action of the spring 24 and indicate upon the exterior of cap 6 that the grease chamber is so nearly exhausted as to require refilling.

It is to be understood that the invention is not limited to the precise construction set forth, it being clear that many changes will readily suggest themselves to persons skilled in the art, even though the principles of operation remain the same. For example, the relative size of parts may be changed and the various pistons may be provided with cup leathers on either or both sides, while the piston or plunger 10 may be provided with a leather washer or cap upon its forward end.

Having described my invention, what I claim is:

1. A device of the character described, comprising a main grease cylinder of relatively large diameter having a piston fitting and sliding therein, and having a removable forward end, a second cylinder in parallelism with the first named cylinder and at one side thereof, a piston therein, a small diameter high pressure grease chamber disposed in alignment with the said second cylinder, a plunger carried by the second named piston and operating in the high pressure grease chamber, a grease discharge line in alignment with the high pressure cylinder, a check valve operating substantially at right angles to the axes of the said two cylinders, and disposed between the first named cylinder and the grease discharge line, an air supply conduit, there being ports associated with said conduit and cylinders, and a three-way valve associated with said conduit and cylinders and operating when turned to one position to admit air to the first named cylinder and vent the second named cylinder to the atmosphere, and when turned to another position to admit air to the second cylinder, and when moved to a third position to vent the first named cylinder to the atmosphere.

2. A device of the character described, comprising a main grease cylinder of relatively large diameter and having a piston fitting and sliding therein and having a removable forward end, a second cylinder in parallelism with the first named cylinder and at one side thereof, a piston therein, a small diameter high pressure grease chamber in alignment with the said second cylinder, a plunger carried by the second named piston and operating in the high pressure grease chamber, a grease discharging line in axial alignment with the high pressure cylinder, a spring actuated check valve operating substantially at right angles to the axes of the said two cylinders and disposed between the first named cylinder and the grease discharge line, an air conduit leading transversely across the rear end of the first named cylinder and directly into the second named cylinder in the rear of the piston therein, a three-way valve in said conduit, there being a port leading directly from the seat of said valve through the rear wall of the main cylinder to the interior of the cylinder and there being a port diametrically opposite the last named port and leading from the seat of the valve directly through the rear wall of the first named main cylinder, to the atmosphere, the arrangement of said ports and the arrangement of the ports of the three-way valve being such that when said valve is turned to one position it admits air to the first named cylinder and vents the second cylinder to the atmosphere, and when turned to another position it admits air to the second cylinder and cuts off the air to the first named cylinder, and when moved to a third position, it vents the first named cylinder to the atmosphere and cuts off the air to the second named cylinder.

In testimony whereof he affixes his signature.

BERNARD B. DOLLY.